Sept. 29, 1931.  J. N. MITCHELL  1,824,915
APPARATUS FOR SEPARATING GRAIN OR SEED OR THE LIKE
Filed Dec. 19, 1927  2 Sheets-Sheet 2

J. N. Mitchell
INVENTOR

By: Marks & Clerk
Attys

Patented Sept. 29, 1931

1,824,915

UNITED STATES PATENT OFFICE

JOHN NANKIVELL MITCHELL, OF STRATHFIELD, NEAR SYDNEY, NEW SOUTH WALES, AUSTRALIA

APPARATUS FOR SEPARATING GRAIN OR SEED OR THE LIKE

Application filed December 19, 1927, Serial No. 241,175, and in Australia December 23, 1926.

This invention relates to apparatus usable for the separation of grain, seed, or the like from the bulk material and foreign matters which are mixed therewith.

The object of the invention is to provide separating apparatus for the purpose mentioned which is of simple and cheap construction; easily and cheaply operatable; and effective in obtaining maximum results in the separation of the desired materials in minimum time.

Figure 1:
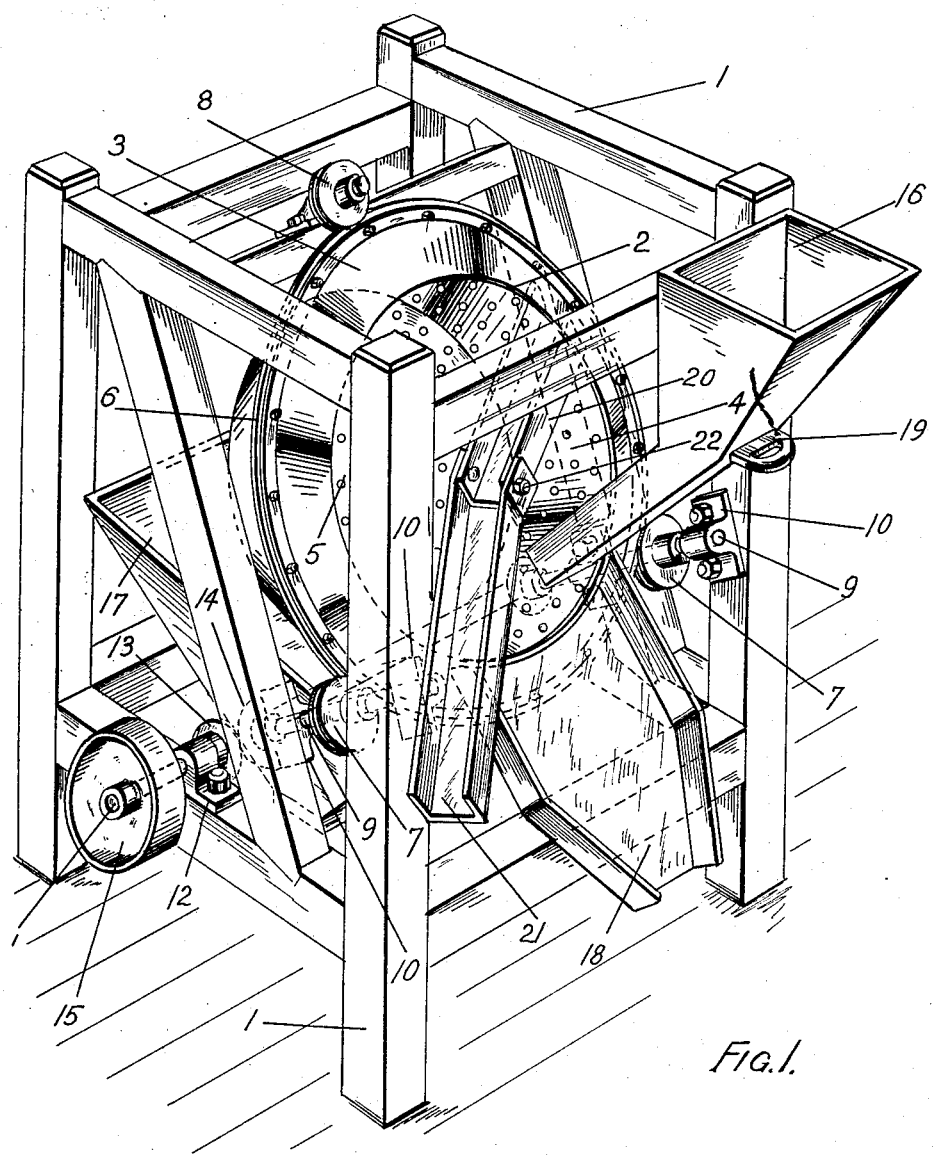
Figure 2:
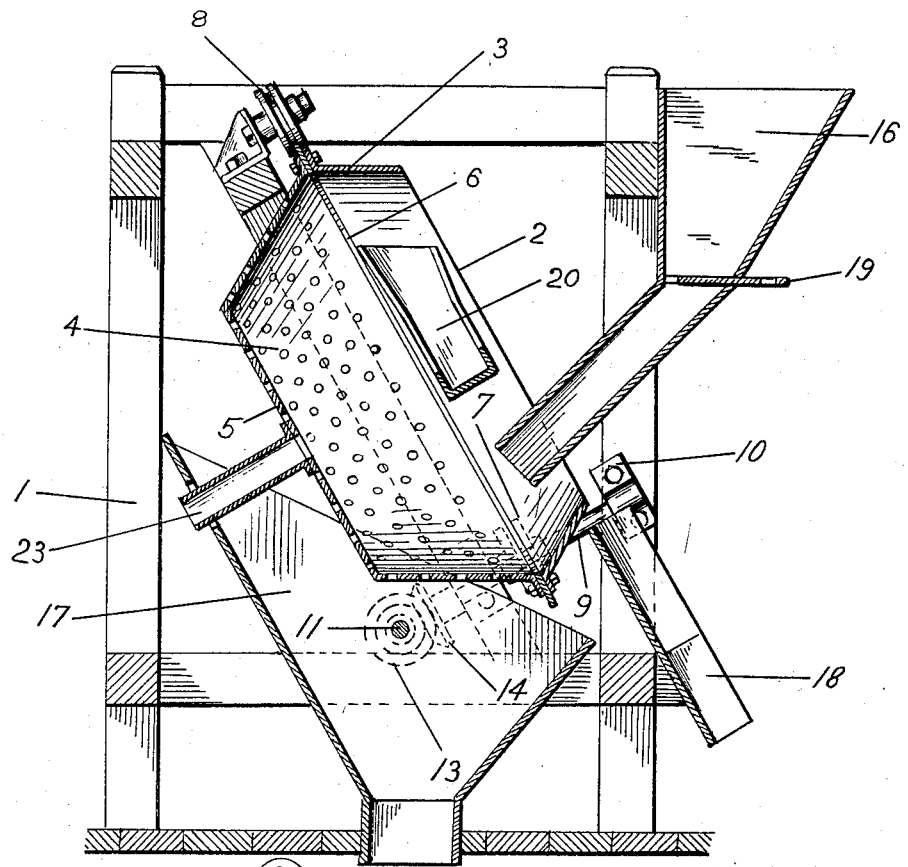
Figure 3:
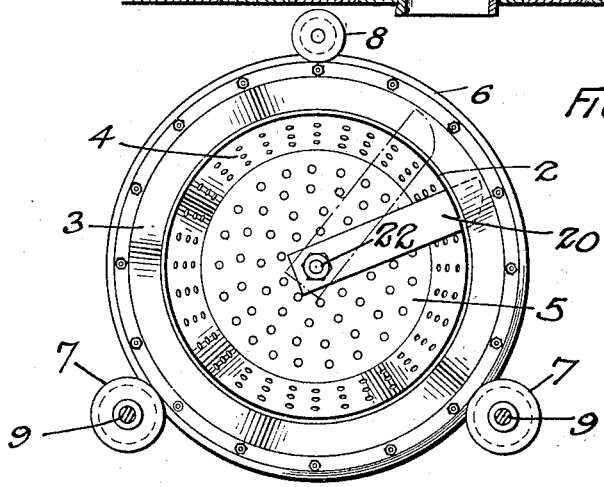

Referring to the accompanying drawings in which the invention is illustrated, Fig. 1 is a perspective view of the apparatus; Fig. 2 cross-sectional view; and Fig. 3 front elevation of separator pan.

A framing 1 of suitable type is provided for the apparatus. Within such framing is angularly carried a separator pan 2 preferably with inclined forward walls 3 and inclined rear perforated walls 4, the pan having a perforated bottom 5. Such pan 2 is furnished with a rim 6 and it is rotatably supported and positioned in the framing 1 on the grooved rotatable friction rollers 7 conjointly with the rotatable friction guide roller 8.

Said rollers 7 are fixed to shafts 9 which are journalled in bearings 10 on the framing 1. A drive shaft 11 is also journalled in bearings 12 on the framing 1, and said shaft 11 has fixed thereto bevel wheels 13 which are adapted to mesh with bevel wheels 14 on the shafts 9 whereby the latter shafts are rotatable. On the shaft 11 is a drive pulley 15 to enable power to be communicated as desired to the shaft 11.

Associated with the framing 1 is a chute 16 to which material to be treated in the apparatus may be fed; the open exit mouth of such chute leads to the open mouth of the pan 2. The latter is situated above a delivery chute 17 supported on the framing 1 and such chute 17 is adapted to receive dust from the material undergoing treatment and to deliver same to a receptacle or otherwise exterior of the framing 1. Said chute 16 may have associated therewith adjustable control means 19 for regulating feed of material to the pan 2.

Supported on the framing 1 is a chute 18 disposed in relation to the open mouth of the pan 2, whereby any light or coarse reject substances of the material undergoing treatment, during the rotation of said pan, will pass into the chute 18 and be delivered therefrom exteriorly of the framing 1 either into a receptacle or otherwise. Heavy reject material which may collect in the pan 2 can be removed therefrom by hand.

To enable the good grain or seed or the like to be collected from the treated material a chute is provided; said chute is preferably made in two sections 20 and 21 which are adjustable in relation to each other, whereby depending on the rotation of the pan 2, the section 20 may be raised or lowered in relation to the open mouth of the pan 2 to catch the separated material as desired. Such chute 20—21 is supportable on the framing 1 and separated material passing thereover may be led therefrom to a suitable receptacle or may be conveyed to a position exteriorly of the apparatus. Adjustable bolts 22 may be furnished connecting the sections 20—21 to each other whereby adjustment of the section 20 may be effected as and when desired.

During rotation of the pan 2 material fed thereto by the chute 16 is separated into its components whereby dust will pass through the perforations in the walls 4 and perforated bottom 5 of the pan into the hopper 17, while light and coarse reject material will flow over the open mouth of the pan into the chute 18.

The angularity of the walls 3 and 4 of the pan 2 is such that in the rotation of the said pan one portion of the walls thereof will be approximately horizontal while the adjoining portion of the walls 3 of the pan 2 will be angularly disposed thereto, whereby motion will be given to the material in the pan to convey light and coarse reject material to the chute 18 and to simultaneously convey good grain to be recovered to the chute 20—21 through which such grain is dischargeable from the apparatus.

The angular disposition of the walls of the pan gives a whirling or spinning motion to the material under treatment, and the light and coarse material, such as chaff and straw (when wheat is treated) rises to the surface and continues in a whirl. When sufficient has accumulated to reach the level of the open mouth of the pan the revolving rim of the mouth cuts the outer edge of the whirl and the material is discharged into chute 18, while the wheat is carried upward by the action of the pan and the lightest of the wheat with oats gather in the apex and as it reaches the top the specific gravity of the grain overcomes the centrifugal action (at the correct speed) and falls into chute 20 and from thence to the chute portion 21 and is thus deliverable exteriorly of the apparatus. The heavier or best grain gathers on the bottom of the pan 5 and in travelling across falls into chute 23. Fine dust and sand pass through the perforations and heavy material such as stones and metal remain in the horizontal portion of the pan.

In connection with the foregoing it is to be noted that the speed of rotation depends on the diameter of the pan also the specific gravity of the material treated; in general use the periphery speed would be of the order of 300 feet per minute. The chute 20 is adjustable during operation, and the position is varied in accordance with the amount of material it is desired to remove at this point.

In operation, assuming that the pan 2 is rotating, material to be separated may be fed to such pan through the chute 16. As the pan 2 is rotating dust passes from the treated material through the perforations in the walls 4 and perforated bottom 5 of the pan 2 into the chute 17, while light or coarse reject material flows over the open front edge of the pan 2 into the chute 18. Any extra coarse reject material remaining in the pan 2 may be subsequently removed. In the rotation of the pan 2, depending on its velocity and the disposition of the open mouth of the section 20 of the chute 20—21 in relation to the open mouth of the pan 2, good grain or the like to be recovered passes into the section 20 and is thus delivered from the pan 2. Feed of material from the chute 16 to the pan 2 is regulatable through the control means 19.

What I claim as my invention and desire to secure by Letters Patent is:—

1. In a grain or like separator, a pan provided with an open mouth the walls of which mouth are reversely angularly inclined to the walls of the rear of the pan which are perforated, a frame on which the said pan is adapted to be disposed angularly and to be rotatable thereon, whereby during the rotation of the said pan light and coarse substances of the material fed to said pan will be discharged from the mouth of the pan and delivered from the apparatus, dust from said material will pass through the perforated walls of the pan, and means associated with the pan for receiving and discharging good grain from the apparatus.

2. A grain or like separator according to claim 1, in which the construction of the pan and the disposition thereof on the framing are such that material to be treated and fed to the pan during the rotation thereof is separated in the pan in such manner that good grain to be recovered is carried in an upward direction in the pan to be automatically discharged therefrom, while the light and coarse substances of the treated material are carried to the mouth of the pan to be automatically discharged therefrom.

3. A grain or like separator according to claim 1, in which the construction of the pan and the disposition thereof on the framing are such that as the pan rotates on the framing part of its rear perforated portion assumes an approximately horizontal plane while the adjoining part of its mouth portion is in angular relation thereto and material fed to the pan to be treated therein is separated by dust passing from such material through the horizontally disposed part of the pan, good grain is carried in an upwardly direction in the pan and discharged therefrom, and light and coarse material is carried to the open mouth of the pan and discharged therefrom.

4. In and for a grain or like separator, a pan having an open mouth and a perforated bottom, the side walls of the said pan being constructed so that the forward portion thereof is reversely inclined to the rearward portion thereof, whereby the open mouth of the pan will be of lesser diameter than the medial portion of the pan, the said rearward portion being perforated.

5. A grain or like separator comprising a framing, a pan having an open mouth and a perforated bottom rotatably and angularly mounted in said framing said pan having reversely inclined side walls so that the open mouth of the pan will be of lesser diameter than the medial portion of the pan, a feed chute for material to be treated and leading to the said pan, means on the framing in association with said pan to receive dust from the latter, means in communication with the open mouth of the pan and adapted to collect from the pan coarse and light rejected material, and means associated with the pan whereby separated material to be collected is feedable from the pan.

6. A grain or like separator comprising a framing, a rearwardly perforated pan with reversely inclined side walls one portion of which leads to an open mouth which is of lesser diameter than the medial portion of said walls, means for rotatably supporting said pan in angular position on said framing, a feed chute for material to be treated and capable of discharging such material into said pan, a hopper below the perforated pan to receive dust from material undergoing treatment in the pan, a chute in communication with the open mouth of the pan and adapted to collect from the pan coarse and light rejected material, and an adjustable chute in communication with the open mouth of the pan and adapted to serve as a collector and discharger for good grain from the pan.

7. A grain or like separator according to claim 1, in which the framing supports a rotatable shaft, the latter having means associated therewith whereby shafts carrying friction rollers contacting with the pan are adapted to be rotated and the pan thereby rotated.

8. A grain or like separator according to claim 1, in which the bottom of the pan is provided with an outlet for separated grain.

In testimony whereof I affix my signature.

JOHN NANKIVELL MITCHELL.